United States Patent

Nyman

[15] 3,665,788
[45] May 30, 1972

[54] HYDROMECHANICAL STORING TRANSMISSION

[72] Inventor: Bengt E. Nyman, Rockford, Ill.
[73] Assignee: Sundstrand Corporation
[22] Filed: Aug. 19, 1970
[21] Appl. No.: 65,199

[52] U.S. Cl. ............................74/751, 74/687, 74/572, 74/675
[51] Int. Cl. ..................F16h 3/74, F16h 47/04, G05g 15/00
[58] Field of Search ............................74/751, 687, 572, 675

[56] References Cited

UNITED STATES PATENTS

| 2,935,899 | 5/1960 | Nallinger | 74/730 |
| 3,488,947 | 1/1970 | Miller et al | 74/687 X |
| 2,803,151 | 8/1957 | Clerk | 74/751 |
| 3,396,607 | 8/1968 | Ross | 74/687 |

*Primary Examiner*—Arthur T. McKeon
*Attorney*—Hofgren, Wegner, Allen, Stellman & McCord

[57] ABSTRACT

A regenerative transmission including split parallel power paths, one being mechanical and the other having an infinitely variable hydrostatic transmission with the power paths being combined by a differential at the transmission output that is constructed to produce a zero output when the hydrostatic drive rotates the differential elements in a subtracting or negative direction at a predetermined speed. The transmission input and the output from the hydrostatic drive are connected through a summing differential to drive a flywheel that stores energy under static conditions and regenerates energy by (1) providing assist torque to the output shaft during acceleration, and (2) absorbing energy normally delivered at the output shaft during deceleration to assist in transmission braking.

10 Claims, 2 Drawing Figures

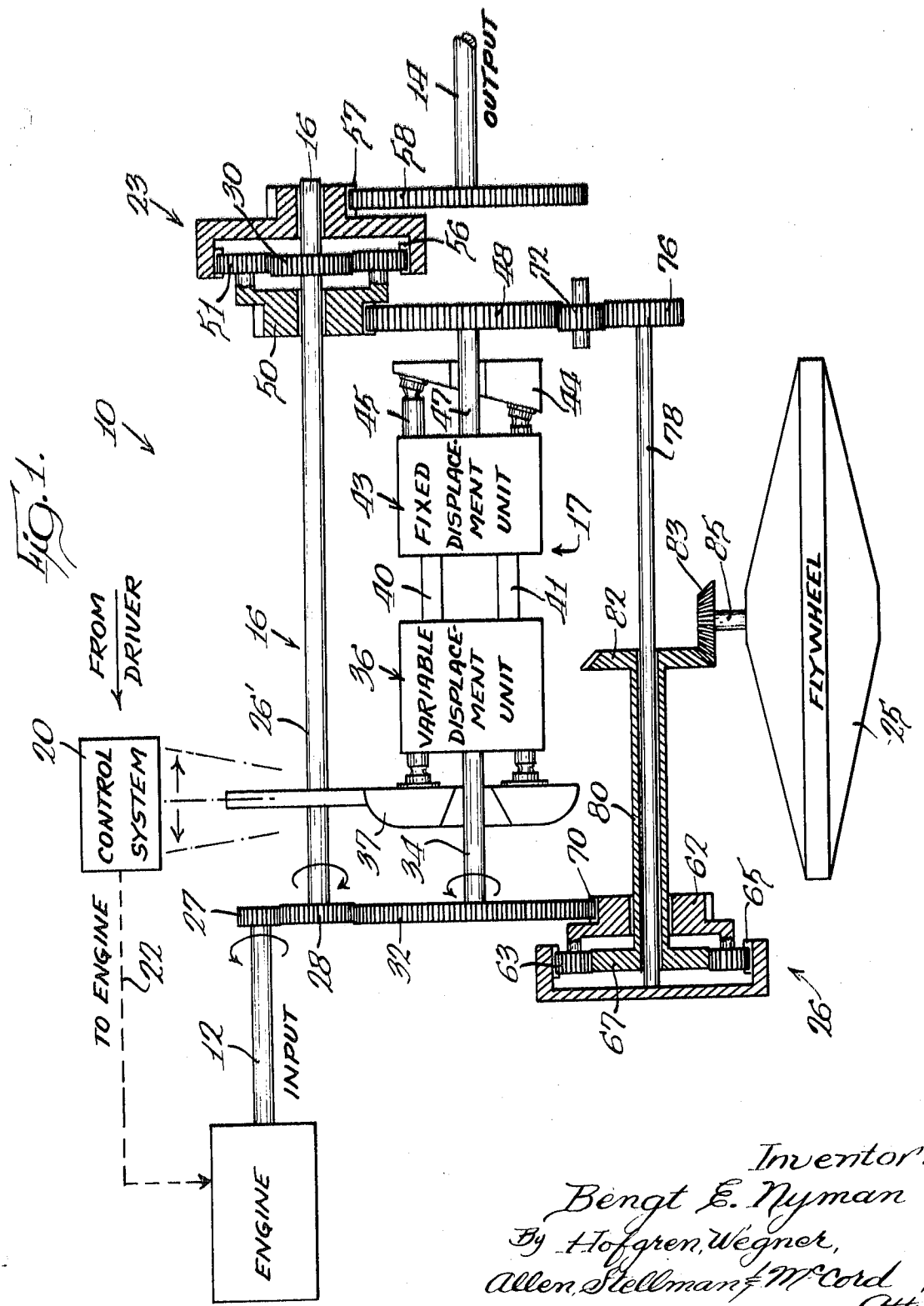

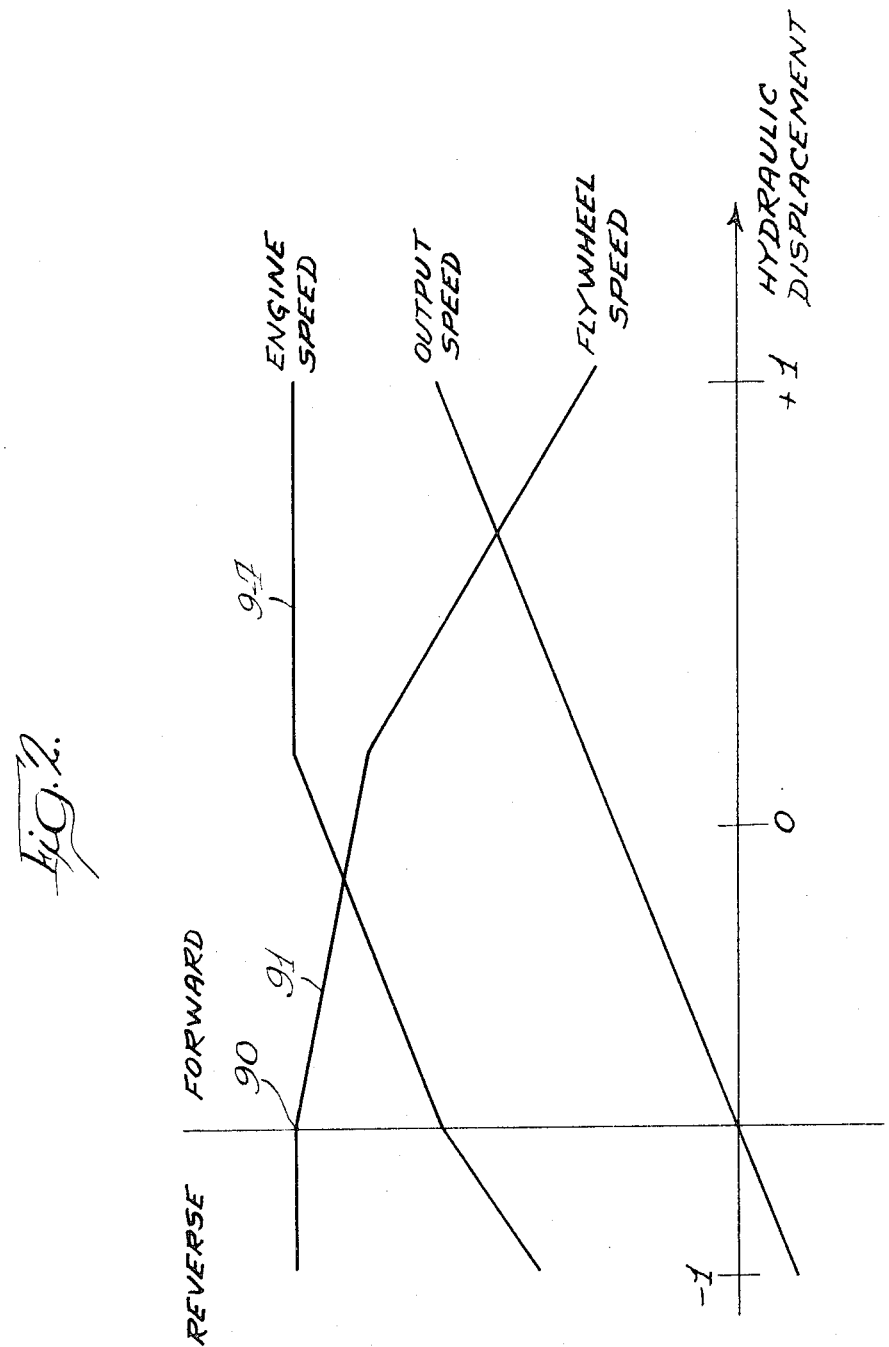

HYDROMECHANICAL STORING TRANSMISSION

BACKGROUND OF THE PRESENT INVENTION

There have in the past been attempts to combine various regenerative devices with prime movers to assist in accelerating or decelerating the output therefrom. These attempts, however, have been unsuccessful to some extent primarily because of the incompatability between the regenerative device, or energy absorption device, and the transmission employed therewith.

It is a primary object of the present invention to provide an energy storage device in combination with a hydromechanical or hydrostatic transmission to obtain maximum fuel economy and minimize the size of and power extraction from the engine without decreasing the acceleration effort provided by the transmission.

SUMMARY OF THE INVENTION

In accordance with the present invention a regenerative transmission is provided of the hydromechanical type that transfers power between the engine and the output during steady state propulsion, transfers power between an energy storing flywheel and the output shaft to assist in acceleration, and transfers power from the output shaft to the flywheel for regenerative retardation to effect output braking. The flywheel serves as an energy storing device and is driven through a summing differential having two inputs, one connected to the transmission input shaft and the other connected to the hydrostatic drive output shaft.

The differential driving the flywheel is of such a nature that at zero transmission output the flywheel is rotating at its maximum speed, thus storing maximum available energy. As the transmission is placed in forward by appropriately varying the transmission ratio of the hydrostatic drive, the flywheel connected differential tends to reduce the speed of the energy storing flywheel.

The release of energy caused by the reduction in speed of the flywheel regenerates power through the differential to the input shaft in a direction to assist acceleration of the transmission. This results in maximum engine fuel economy as well as permitting a reduction in size of the required prime mover for a given acceleration effort. Upon deceleration of the transmission output by appropriate control of the speed ratio of the hydrostatic drive, the flywheel connected differential tends to increase the speed of the flywheel. In this mode the flywheel absorbs energy normally dissipated by the vehicle brakes, by regenerating torque in a reverse direction at the transmission input tending to decrease the speed of the output shaft and effect an assist to transmission braking.

The present device has particular utility with combustion engines and more specifically with gas and organic turbine engines to provide a complete power train with overall performance surpassing existing power trains.

BRIEF DESCRIPTION OF THE DRAWING

FIG. 1 is a schematic illustration of a hydromechanical transmission embodying the present invention; and FIG. 2 is a curve showing engine speed, output shaft speed, and flywheel speed with respect to hydraulic displacement of the transmission shown in FIG. 1.

DETAILED DESCRIPTION OF THE PREFERRED EMBODIMENT

Referring to the drawing a regenerative hydromechanical transmission 10 is illustrated having an input shaft 12 adapted to be driven by a suitable prime mover, such as a gas turbine. The input shaft 12 drives a transmission output shaft 14 through split power paths including a mechanical path 16 and a parallel hydraulic path including a hydrostatic transmission 17. A control system 20 is provided for controlling both the displacement or ratio of hydrostatic drive 17 as well as controlling the fuel to the prime mover as indicated by arrow 22.

The split power paths are combined by an output differential 23 connected to drive output shaft 14. To effect regeneration of power to assist in both acceleration and braking, a flywheel 25 is provided driven through a summing differential 26 by the transmission input and the transmission output, as will appear more clearly below.

The mechanical path to the output differential 23 takes the form of shaft 26' which is driven by the input shaft through gears 27 and 28. The right end of shaft 26 carries a sun gear 30 which forms a part of the differential 23.

The hydrostatic drive 17 is also driven directly by input shaft 12 through gears 28 and 32, the latter gear being keyed to shaft 34 drivingly connected to a variable displacement hydraulic unit 36.

Variable displacement hydraulic unit 36 is of the multiple axial piston type having a pivotal swash plate 37 for varying the hydraulic displacement of the unit. The variable displacement unit 36 is connected by hydraulic conduits 40 and 41 to a fixed displacement unit 43 having a cam 44 for reciprocating pistons 45 associated therewith. Hydraulic unit 43 is also of the axial piston variety and is of itself a conventional component. It should be understood that hydraulic units 36 and 43 can each act either as a pump or motor depending upon the direction of power flow. Fixed displacement unit 43 is adapted to deliver power to and from a shaft 47 connected therewith which carries a gear 48 on the end thereof.

Gear 48 is drivingly connected to a planetary gear carrier 50 having planetary gears 51 forming a part of the differential 23 and engaging teeth on the sun gear 30. Planetary gears 51 also engage teeth on ring gear 56 which drives output shaft 14 through gears 57 and 58.

Thus, the differential 23 serves to recombine the power from the mechanical power path 16 and the hydrostatic power path 17 and permits a far greater range of output shaft speeds and torques than possible with a straight hydrostatic drive.

The differential 23 is constructed with respect to the displacement control system 20, such that on a predetermined reverse displacement of cam 37; e.g., a predetermined position counterclockwise from the neutral position shown on the drawing, the differential 23 will provide zero output and thus the transmission 10 will be in neutral. To effect this, the hydraulic unit 43 rotates in a direction to subtract sufficient speed from the differential to compensate for the continuous unidirectional input provided by sun gear 30 from the mechanical path. For example, if the input shaft 12 rotates counterclockwise, when viewed from the input shaft side, sun gear 30 will rotate clockwise. To produce a zero output, i.e., hold ring gear 56 stationary, planetary gear carrier 50 must also rotate in a clockwise direction at a sufficient speed to do so. The control system 20 is constructed to place the cam 37 in the correct position to achieve this rotation of carrier 50 when neutral transmission is desired.

Thus, in the neutral state of the entire transmission, the variable displacement hydrostatic drive 17 subtracts speed from the differential.

As the cam member 37 is moved toward neutral central position, the speed of the carrier 50 reduces, providing a counterclockwise rotation of the ring gear 56 (when viewed from the input shaft side). As the control 20 continues to reduce the displacement of cam 37, less and less speed will be subtracted from differential 23, increasing the speed of the output ring gear 56 and shaft 14. As the cam 37 passes through neutral as indicated by the zero abscissa point on the curve of FIG. 2, the planetary carrier 50 in differential 23 will reverse direction, begin rotating in a counterclockwise direction and adding, rather than subtracting, speed to differential 23 providing a further increase in output speed from the overall transmission.

Reverse output from the transmission is achieved by moving the cam 37 from its position producing zero output further in a counterclockwise displacement direction as viewed in FIG. 1, effecting a further subtraction from differential 23 by carrier 50 and producing a clockwise rotation of the ring gear 56. It should be understood with reference to the entire description herein that the gearing rotation is as viewed from the input side of the transmission.

The flywheel 25 is provided in conjunction with the differential 26 to effect torque or energy regeneration for the present hydromechanical transmission in a manner to (1) assist input torque at gear 28 in response to acceleration of the output shaft 14, and (2) provide a retarding torque at the input gear 28 in a direction opposite the rotation thereof in response to deceleration of the output 14 to effect inherent braking. Thus, flywheel 25 releases energy to the transmission during acceleration and absorbs energy from the transmission during braking that otherwise would be dissipated in the brakes of the associated load device.

Toward this end the differential 26 includes a gear carrier 62 having planets 63 that interengage a ring gear 65 and a sun gear 67. Carrier 62 has a gear 70 interengaging gear 32 which provides one input to the differential 26 from the input shaft 12. The other input to the differential is provided by the hydrostatic output gear 48 through idler gear 72 which meshes with gear 76 carried by elongated parallel shaft 78 fixed at its left end to the ring gear 65.

The sun gear 67 is carried by sleeve 80 which has a bevel gear 82 on the end thereof interengaging bevel gear 83 connected through shaft 85 to drive the flywheel 25.

The differential 26 is arranged so that the speed of the sun gear 67, and hence the speed of the flywheel 25, is proportional to the sum of the speeds of the ring gear 65 and the planetary gear carrier 62. Thus, the speed of the flywheel 25 is proportional to the sum of the speeds of the input shaft 12 and the output from the hydrostatic drive 17.

The planetary gearing 26 is also constructed, by selecting the appropriate gear ratios, to achieve maximum flywheel speed when the speed of the output shaft 14 is zero as shown as point 90 on curve 91 in FIG. 2. At neutral, i.e., neutral of the entire transmission and not neutral displacement of hydraulic unit 36, the hydraulic unit 36 drives the fixed unit 43 in a direction, e.g., counterclockwise, to effect a counterclockwise rotation of the ring gear 65. The unidirectional counterclockwise input rotation of shaft 12 provides a clockwise rotation of the carrier 62. This opposite rotation of carrier and ring gear provides a speed of sun gear 67 proportional to the sum of the speeds of the ring gear and the carrier 62. In the neutral state of the transmission, the hydraulic unit 43 and gear 48 are rotating near maximum speed while the input shaft and carrier 62 are rotating somewhat below maximum speed as shown by curve 94 in FIG. 2. This provides a maximum speed of sun gear 67 and flywheel 25.

As the control system, in response to driver input, commands forward rotation of the transmission, the displacement of cam 37 is reduced toward neutral, reducing the speed of the fixed unit 43 and reducing the speed of ring gear 65. As the speed of ring gear 65 decreases this has the result of decreasing the speed of the sun gear 67 and the flywheel 25. As the speed of flywheel 25 is thereby reduced a reaction torque results therefrom on the carrier 62 tending to rotate the carrier in a clockwise direction, or more specifically in the same direction that it is rotating. This regenerative reaction torque, when transferred through gears 32 and 28 acts in the same direction of rotation as the input torque from the engine thereby increasing the acceleration energy through the transmission.

If, for example, the operator decreases transmission ratio to decrease the speed of output shaft 14 when displacement control 37 is on the left side of its neutral displacement position shown in FIG. 1, the control 20 increases the displacement of cam 37 increasing the speed of gear 48 and ring gear 65 in a clockwise direction. This increases the speed of the sun gear 67 and flywheel 25. However, the inertial retarding effect of flywheel 25 provides a reverse torque on the carrier 62 through pinions 63, acting in a counter-clockwise direction tending to decrease the speed of the carrier 62. This reverse torque acts through gears 32 and 28 tending to retard the rotation of shafts 26 and 34 associated with the split power paths. The net effect is that flywheel 25 absorbs the inertial deceleration energy of the transmission during deceleration.

As is apparent from curve 94 in FIG. 2, the control system 20 is arranged to provide a signal to the throttle to program engine speed as indicated by the curve, increasing from neutral to approximately the zero displacement position of cam 37 and thereafter remaining substantially constant. One further point should be made with respect to the differential 26 as the displacement of cam 37 is moved to neutral in the forward mode of the transmission. During this transition the direction of rotation of the gear 48 as well as ring gear 65 reverses, but the gear ratio of differential 26 is such that the direction of sun gear 67 will not be reversed due to this reversal, and that throughout the maximum range of the transmission the speed of the flywheel 25 will always be positive as shown by curve 91 in FIG. 2.

It is clear from the above description that engine power is used primarily to make up for inefficiency of the transmission and vehicle, and the steady state vehicle resistance. At steady state speed the engine speed, the hydraulic ratio, the fixed hydraulic unit speed, the output speed and the flywheel speed are all constant and driven by the engine alone. The steady state performance is therefore determined by engine performance only.

I claim:

1. A regenerative transmission, comprising: an infinitely variable transmission, input shaft means adapted to be driven by a prime mover and connected to drive said infinitely variable transmission, output shaft means connected to be driven by said infinitely variable transmission, and energy storage means for adding torque to said output shaft means responsive to acceleration of the output shaft means by the variable speed transmission, said energy storage means being drivingly connected to the transmission so that it is driven at a speed inversely related to the speed of the output shaft means.

2. A regenerative transmission, comprising: an infinitely variable transmission, input shaft adapted to be driven by a prime mover and connected to drive said infinitely variable transmission, output shaft means connected to be driven by said infinitely variable transmission, and energy storage means for reducing the torque of the output shaft means responsive to deceleration of the output shaft means by said infinitely variable transmission, said energy storage means being drivingly connected to the energy storage means so that it is rotated at a speed inversely related to the speed of the output shaft means.

3. A regenerative transmission, comprising: an infinitely variable transmission, input shaft means adapted to be driven by a prime mover and connected to drive said infinitely variable transmission, output shaft means connected to be driven by said infinitely variable transmission, and energy storage means for braking the output shaft means responsive to deceleration of the output shaft means by said infinitely variable transmission, said energy storage means being connected to accelerate upon deceleration of the output shaft means.

4. A regenerative transmission, as defined in claim 1, wherein said energy storage means includes a flywheel, and means for driving the flywheel at maximum speed when the infinitely variable transmission is in neutral.

5. A regenerative transmission, as defined in claim 4, wherein said energy storage means includes a flywheel, and means for driving the flywheel at maximum speed when the infinitely variable transmission is in neutral, including a differential for driving said flywheel, said differential including a first input gear drivingly connected to the input shaft means, a second input gear drivingly connected to the infinitely variable transmission, and a third gear drivingly connected to the flywheel.

6. A regenerative transmission, as defined in claim 5, wherein said differential is arranged to decrease the speed of the third gear in response to an increase in speed of the output shaft means.

7. A regenerative transmission, as defined in claim 5, wherein said differential is constructed to increase the speed of the third gear in response to a decrease in speed of the output shaft means.

8. A regenerative transmission, comprising: an output shaft, a variable speed hydraulic transmission driven by said input shaft, means for varying the speed ratio of said hydraulic transmission, a first differential including a first gear drivingly connected to said input shaft, a second gear dirvingly connected to said variable speed hydraulic transmission, and a third gear driven by the interaction of said first and second gears, an output shaft, said third gear being drivingly connected to said output shaft, an energy storage device for assisting acceleration and deceleration of said output shaft including a rotary flywheel, a second differential including a first gear drivingly connected to said input shaft, a second gear drivingly connected to said variable speed hydraulic transmission, and a third gear driven by the interaction of said first and second gears and drivingly connected to said flywheel.

9. A regenerative transmission as defined in claim 8, wherein said second differential is constructed to sum the speed of the first and second gears so that upon an increase in speed of said first gear the third gear speed will tend to decrease, said hydraulic transmission being constructed to subtract speed from said first differential to effect zero output shaft rotation at a predetermined displacement, said second differential being constructed to rotate the flywheel at a maximum speed when the hydraulic transmission is at said predetermined ratio.

10. A regenerative transmission as defined in claim 8, wherein said first gear of the first differential is a sun gear, said second gear of said first differential being a planetary gear device, said third gear of said first differential being a ring gear, said first gear of said second differential being a planetary gear device, said second gear of said second differential being a ring gear, and said third gear of said second differential being a sun gear adapted to drive the flywheel.

* * * * *

PO-1050
(5/69)

UNITED STATES PATENT OFFICE
CERTIFICATE OF CORRECTION

Patent No. 3,665,788            Dated May 30, 1972

Inventor(s) Bengt E. Nyman

It is certified that error appears in the above-identified patent and that said Letters Patent are hereby corrected as shown below:

Column 4, line 38, after "shaft" insert --means--.

Column 5, line 5, delete "output" and insert --input--.

Column 5, line 9, delete "dirvingly" and insert --drivingly--.

Signed and sealed this 17th day of September 1974.

(SEAL)
Attest:

McCOY M. GIBSON JR.            C. MARSHALL DANN
Attesting Officer               Commissioner of Patents